United States Patent
Von Bergen et al.

[11] Patent Number: 5,219,434
[45] Date of Patent: Jun. 15, 1993

[54] SEALING ARRANGEMENT FOR ROTATING PROPELLER SHAFTS OF SHIPS

[75] Inventors: Ernst-Peter Von Bergen, Ahlefeld; Günter Pietsch, Hamburg, both of Fed. Rep. of Germany

[73] Assignee: Blohm+Voss AG, Hamburg, Fed. Rep. of Germany

[21] Appl. No.: 838,569

[22] Filed: Feb. 19, 1992

[30] Foreign Application Priority Data

Feb. 19, 1991 [DE] Fed. Rep. of Germany ....... 4105042

[51] Int. Cl.[5] .................... F16J 15/32; F16J 15/54
[52] U.S. Cl. .................................. 277/23; 277/59; 277/25; 277/133; 210/171; 440/112
[58] Field of Search ............. 277/23, 58, 59, 25, 277/96.1, 13, 133, 134; 210/171; 440/112

[56] References Cited

U.S. PATENT DOCUMENTS

| | | | |
|---|---|---|---|
| 3,625,523 | 12/1971 | Gardner et al. | 440/112 X |
| 3,664,675 | 5/1972 | Malmstrom | 277/134 X |
| 3,838,862 | 10/1974 | Fern | 277/96.1 |
| 3,854,732 | 12/1974 | Franz et al. | 277/58 |
| 4,174,672 | 11/1979 | Cox | 440/112 |
| 4,428,587 | 1/1984 | Forch | 277/133 X |
| 4,448,425 | 5/1984 | von Bergen | 277/34 |
| 4,482,159 | 11/1984 | Ishitani et al. | 277/59 X |
| 4,698,156 | 10/1987 | Bumpers | 210/333.01 X |
| 4,724,078 | 2/1988 | Auriol et al. | 210/490 |
| 4,780,213 | 10/1988 | Ogletree | 210/193 X |
| 4,844,255 | 7/1989 | Schmitt | 277/23 |
| 5,064,534 | 11/1991 | Busch et al. | 210/266 |

FOREIGN PATENT DOCUMENTS

| | | |
|---|---|---|
| 0925327 | 2/1955 | Fed. Rep. of Germany ........ 277/23 |
| 1207739 | 12/1965 | Fed. Rep. of Germany ........ 277/25 |
| 3205538 | 7/1983 | Fed. Rep. of Germany . |
| 1215221 | 12/1970 | United Kingdom ................ 277/25 |

Primary Examiner—William A. Cuchlinski, Jr.
Assistant Examiner—James K. Folker
Attorney, Agent, or Firm—Nils H. Ljungman and Associates

[57] ABSTRACT

A seal arrangement for rotating shafts, in particular a propeller shaft of a ship which is in contact with water containing impurities, is designed to provide a filter portion substantially adjacent the outermost seal to thereby filter dirt particles out of the water and keep the dirt particles out of the vicinity of the seal. Such a filter can be made from a sintered material and can essentially be designed to fit the existing space available along the propeller shaft.

20 Claims, 4 Drawing Sheets

SEALING ARRANGEMENT FOR ROTATING PROPELLER SHAFTS OF SHIPS

BACKGROUND OF THE INVENTION

1. Field of the Invention

This invention relates to a seal arrangement for rotating shafts, in particular, for the rotating propeller shafts of ships. Propeller shafts can be equipped with at least one ring seal and/or an axial face seal, along with at least one additional backup seal which has an annulus open to the medium in which the propeller is disposed. Along with this annulus, there can also be associated a ring-shaped dirt deflector which creates a backpressure in the annulus when the shaft rotates. To minimize the amount of fine particle contaminants present in the annulus, which particles could eventually pass through the seals of the shaft, the outermost backup seal can be provided with a porous wall, or filtering portion, through which the medium would have to pass before entering into and passing through the annulus.

2. Background Information

The known seal arrangements may offer sufficient protection against the penetration of coarse dirt particles into the annulus, but the protection is reduced when the dirt particles in question are fine particles which get sucked into the annulus on account of the underpressure which develops during rotation. Thus, these fine particles could enter into the vicinity of the ring seals.

German Patent No. 32 05 538 discloses seals for rotating shafts, which shafts have, in front of the ring seal, a plate which rotates along with the shaft. This rotating plate is equipped with pump elements which generate a circulating flow of the medium, and on the inflow side of the flow path of this circular flow, a porous layer is included. In this known system, however, the medium to be sealed out is not water bearing dirt and impurities, but is instead, an air-fluid mixture, in particular, an oil spray, such as that which occurs in the crankcase of an internal combustion engine. Accordingly, in this case the porous layer does not act to deflect dirt, but instead acts as a phase separator which separates the fluid phase from the gas phase of a gas-fluid mixture.

OBJECT OF THE INVENTION

The object of the invention is therefore to overcome the disadvantage of not being able to effectively seal out fine particles, and accordingly, improve a seal arrangement of the type described above, so that even the extremely fine dirt particles will be kept away from the ring seals.

SUMMARY OF THE INVENTION

This object is achieved by means of a sealing arrangement which is equipped with a porous filtering area for filtering the medium in which the propeller is disposed, before this medium enters the annulus disposed about the shaft of the propeller. The annulus itself is open on one end to the medium, and at this opening there is disposed a ring-shaped dirt deflector which is designed in the manner of a lip seal. This lip seal is preferably in contact, at one side, with the shaft, and at the other side, with an end surface of the outermost ring seal. This arrangement causes an underpressure to occur within the annulus as the shaft rotates. This underpressure results in the streaming of medium through the porous layer and along the annulus in a direction away from the ring seals.

This streaming of medium through the porous layer into the annulus ensures that a constant circular flow of medium is maintained, the flow direction of which is opposite to the direction of flow which would be towards the seal itself, thereby preventing the penetration of contaminated medium into the seal.

Further advantageous embodiments of the sealing arrangement according to the invention are provided herebelow.

For example, the porous area can preferably be disposed in the wall of the outermost backup ring adjacent to the annulus, by structurally altering the wall to make the wall permeable to fluids. Such alterations make possible an integration of the porous layer into the outermost backup ring, which may be desirable when there is limited space available in the axial direction of the shaft.

If space is not a problem, the porous area can preferably be formed by a separate backup ring which is made of porous material and interposed between the outermost backup ring and the next adjacent backup ring.

Also, the dirt deflector can preferably be equipped with dynamically acting pump elements, such as fins or spiral grooves which, when the shaft rotates, generate a pumping action to improve flow of medium away from the opening of the annulus. This ability to intensify the circulating flow through the annulus is particularly important if, after the shaft has been operating for a rather long period in dirty water, the permeability of the porous layer has been reduced by clogging.

These pumping elements can also preferably be designed so that when the direction of rotation of the shaft is reversed, there is also a reversal of direction of the flow through the porous layer. In this manner, a certain self-cleaning of the porous layer is possible. Such a self-cleaning operation is intended to prevent the pores from clogging and thereby allow for relatively long periods of normal operation.

One aspect of the invention resides broadly in a seal arrangement for a rotating propeller shaft of a ship, the propeller shaft having a first end disposed within the ship and a second end at least partly disposed in water having impurities therein. The seal arrangement comprises: at least one seal for being disposed about the propeller shaft between the first end of the shaft and the second end of the shaft; a device for retaining the at least one seal about the propeller shaft; the device for retaining comprising at least a first portion for being disposed about at least a portion of the second end of the propeller shaft adjacent the at least one seal; and apparatus for providing filtered water to an area in contact with the at least one seal. At least a portion of the apparatus is for providing filtered water for being disposed at the propeller shaft to provide substantially filtered water to the area in contact with the at least one seal, and the apparatus for providing filtered water comprises a device for filtering the impurities from the water.

Another aspect of the invention resides broadly in a seal arrangement for a rotating shaft, such as the shaft of a propeller for a ship, the shaft having a first end and a second end, the first end for being disposed in a first medium and the second end for being disposed in a second medium having particulate matter therein. The seal arrangement comprises: at least one seal for being disposed about the shaft between the first end of the shaft and the second end of the shaft to separate the first medium from the second medium; a device for retaining the at least one seal about the shaft; the device for retaining comprising at least a first portion for being disposed about at least a portion of the second end of the shaft adjacent the at least one seal; and apparatus for filtering the particulate matter from the second medium. The apparatus for filtering is for being disposed about the shaft to provide substantially filtered second medium to an area in contact with the at least one seal.

BRIEF DESCRIPTION OF THE DRAWINGS

The invention is described in more detail below, with reference to the accompanying drawings, in which.

DESCRIPTION OF THE PREFERRED EMBODIMENTS

Figure 1:
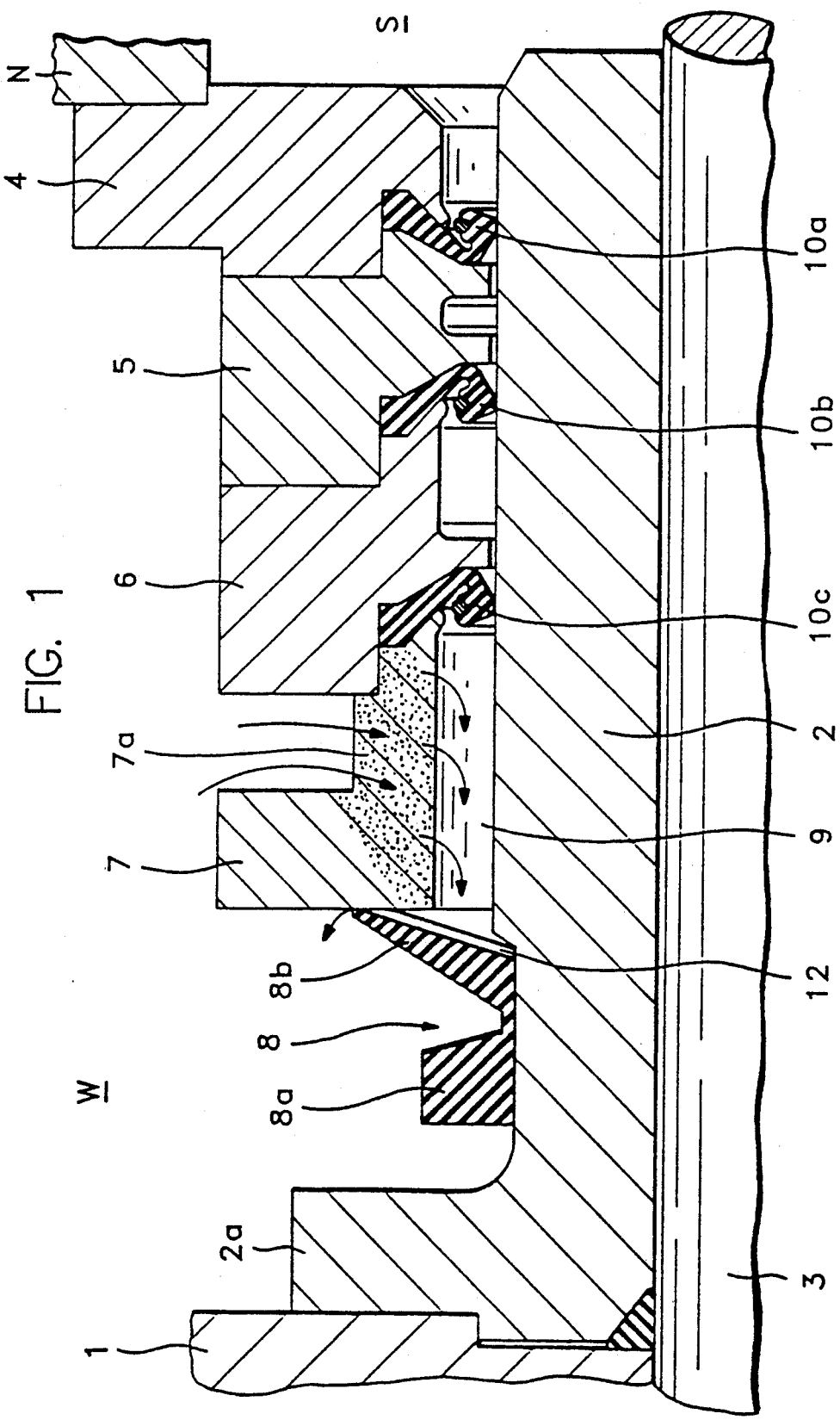
FIG. 1 shows, in longitudinal section, a seal arrangement having three lip seals and a porous area as a structural part of the wall of the support ring for the outer backup seal.
Figure 2:
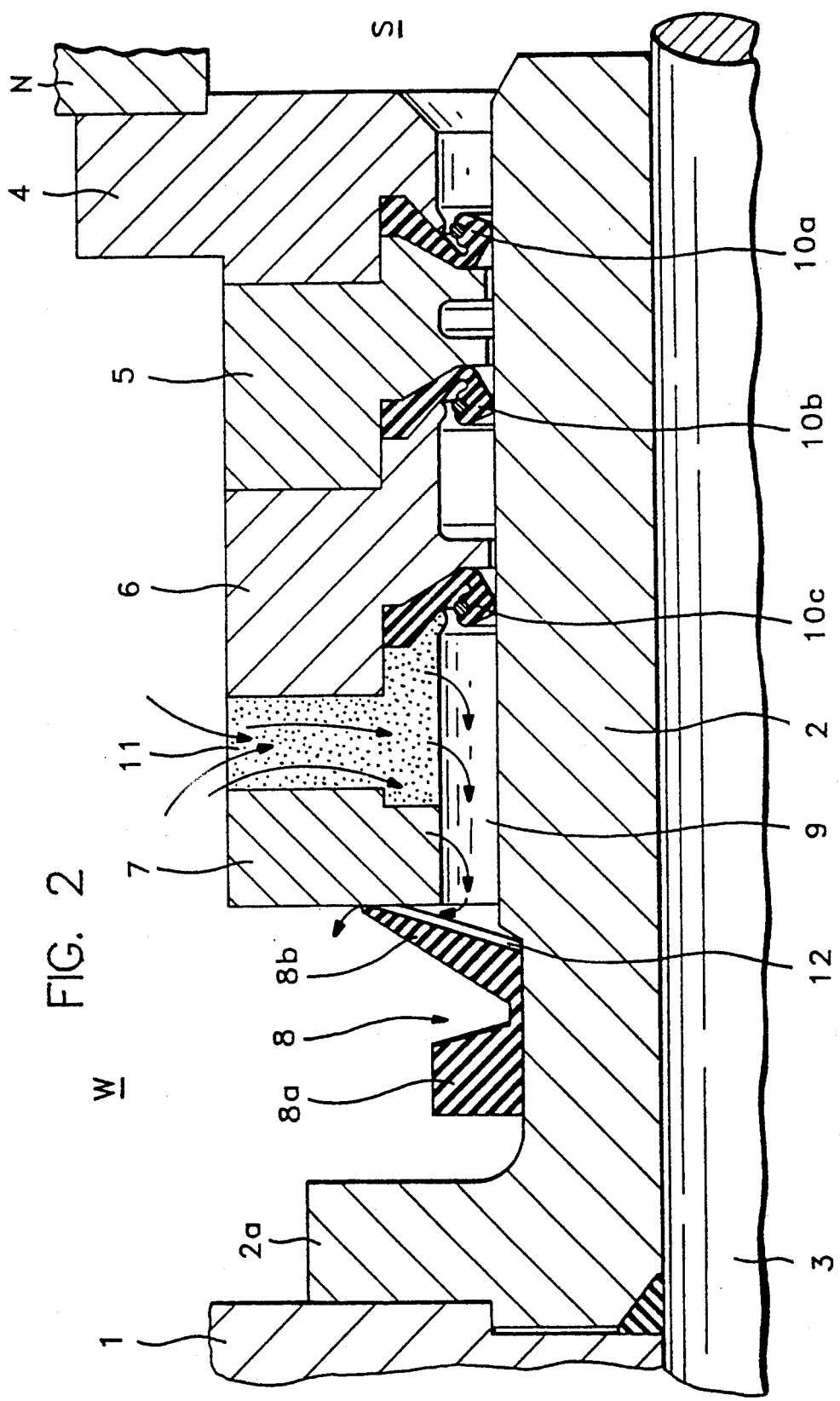
FIG. 2 shows, in longitudinal section, a seal arrangement similar to that illustrated in FIG. 1, with a porous area as a separate ring disposed between the two outermost seal support rings.

As shown in both of FIGS. 1 and 2, the propeller shaft 3, of a ship, can be torsionally connected to a shaft bushing 2. A flange 2a of the shaft bushing 2 can preferably be bolted to the propeller 1, which propeller 1 is shown only schematically, so that the bushing 2 can rotate together with the propeller.

One end of the bushing 2 projects into the external water W and the other end of the bushing 2 projects into the lubricating oil chamber S of the shaft bearing (not shown).

In contact with the shaft bushing 2 there can be a number of lip seals. FIGS. 1 and 2 show three lip seals while FIGS. 3 and 4, described herebelow, show four lip seals. The three lip seals 10a, 10b, and 10c, of FIGS. 1 and 2 are preferably located adjacent one another and at some distance from one another along the shaft. Two of the lip seals 10b, 10c preferably face the outside water W, to seal out the outside water W, and the other lip seal 10a preferably faces the lubrication oil chamber S of the shaft bearing (not shown), to seal in the lubrication oil.

It can further be stated that a first set of seals is for being disposed in a direction facing a second medium to seal out the second medium, and a second set of seals is for being disposed in a direction facing a first medium to seal in the first medium, wherein the first and the second mediums comprise at least one of the following sets of mediums: gas and liquid; and first liquid and second liquid.

Each of the lip seals 10a, 10b, and 10c can preferably be braced between two support rings 4 and 5; 5 and 6; and, 6 and 7; respectively, and these support rings 4-7 can be connected to one another and fastened, as a whole, to the stern tail post N of the ship.

In both FIGS. 1 and 2 there is shown an annulus 9 which is essentially open toward the outside water W, and which annulus is preferably disposed in the outermost backup ring 7, between the outermost lip seal 10c facing the outside water W, and the outside water W. In front of the opening of this annulus 9 there can be a ring-shaped dirt deflector 8, which dirt deflector 8 can have an approximately U-shaped cross section. This dirt deflector 8 can preferably be torsionally connected by the base of one of its legs 8a to the shaft bushing 2, and the other leg 8b can be disposed so the outer end of the leg 8b is in light contact against the end wall of the outermost backup ring 7.

Another preferred embodiment of the sealing arrangement according to the present invention is that the above-mentioned leg 8b of the dirt deflector 8 can have fins 12, or spiral grooves, on its side facing the backup ring. These fins 12, on account of a centrifugal acceleration of the outside water during shaft rotation, can increase the underpressure in the annulus 9.

Another preferred embodiment of the present invention is that the wall adjacent to the annulus 9 preferably has a porous region. This porous region makes possible a streaming of outside water into the annulus 9, whereby particles of dirt are captured by the porous region, and thus the outside water can only reach the lip seal 10c after it has been substantially freed of dirt particles.

The configuration of the porous area, depending on the available space about the shaft, can vary, as shown by the two embodiments of FIGS. 1 and 2. In FIG. 1, the porous layer is shown as a structural modification 7a of the support ring 7, which structural modification, in essence, provides water permeability to the support ring 7. As shown in FIG. 2, the porous area can also be formed by a separate backup ring 11 which can essentially be made entirely of porous material. In addition, this separate backup ring 11 can also be made, depending on the desired flow through the ring, with varying amounts of porous material. This type of separate backup ring is preferably braced between the backup ring 7 and the backup ring 6.

This porous area of ring 7, or, all or part of the porous ring 11 can be made from a sintered material which would essentially allow the passage of water therethrough, while filtering out any dirt particles. Several types of sintered materials are disclosed in U.S. Pat. Nos.: 4,698,156 to Norman Bumpers, entitled "Rotating Filter Apparatus for Separating Fine Particles of Solids from a Liquid"; 4,724,078 to Alain Auriol and Jacques Gillot, entitled "Porous Material and Tubular Filter Made of Said Material"; 4,780,213 to Bruce Ogletree, entitled "Filter Media and Method of Filtration"; and 5,064,534 to Erich and Michael Busch, entitled "Filter for the Purification of Tap Water". These, as well as any other sintered filter material, can be utilized depending on the porosity needed, the desired flow rate through the filter and annulus, and the desired degree of filtering.

Figure 3:
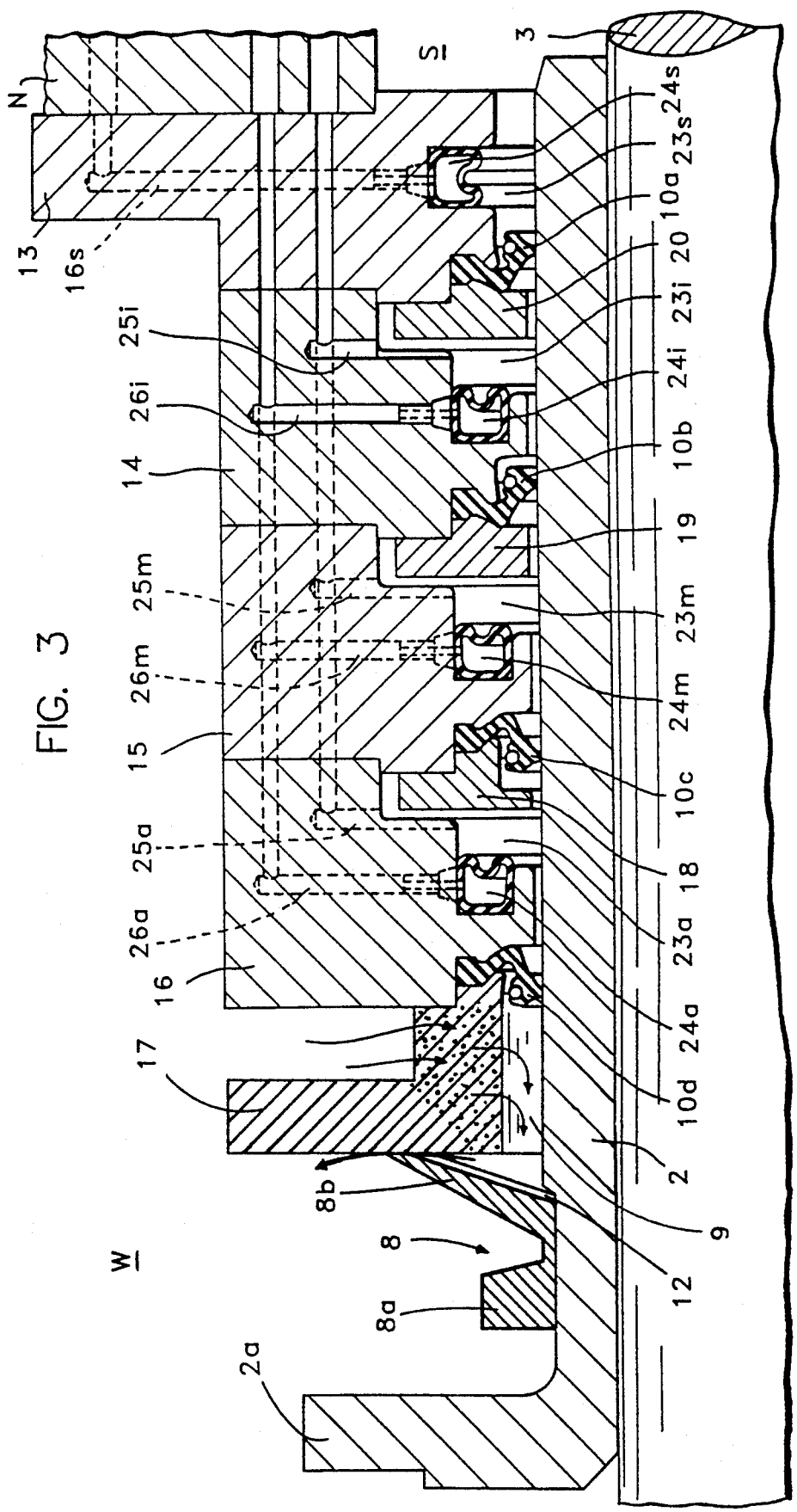
FIG. 3 shows, in longitudinal section, a porous structure in use for a seal arrangement having four lip seals and a lubricating oil heating arrangement.
Figure 4:
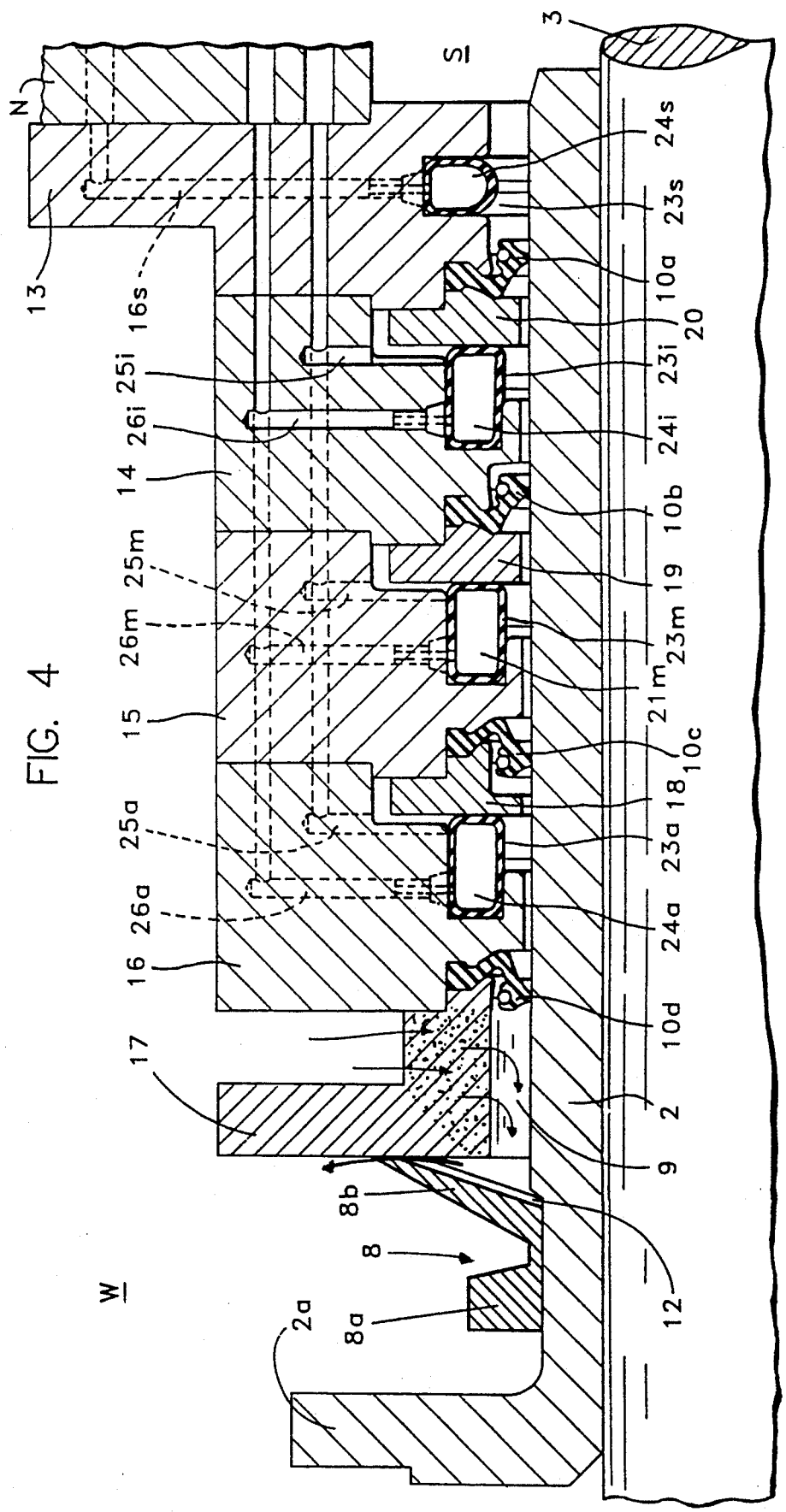
FIG. 4 shows the arrangement of FIG. 3 with the heating passages inflated.

Another embodiment of a seal arrangement which can utilize such a porous filter is depicted in FIGS. 3 and 4. The seal arrangement of FIGS. 3 and 4 provides a means for heating the lubricating oil disposed about the shaft bushing 2 when the propeller is disposed in cold water W. In FIG. 3, as discussed previously, there are four, rather than three, ring seals 10a, 10b, 10c, and 10d, with the seals 10c and 10d disposed towards the water W, and the seals 10a and 10b disposed towards the lubricating oil chamber S. The four ring seals are preferably mounted on ring parts 13, 14, 15, and 16, which are located adjacent one another in an axial direction along the shaft. Ring part 13, which is adjacent to lubrication oil chamber S, can be fastened to stern nut N. Thus, ring part 13 essentially supports the entire sealing apparatus. The fastening of lip seals 10a, 10b, 10c, and 10d to ring parts 13, 14, 15, and 16 can be done, as shown in this embodiment by chucking or fixing, for which purpose there are provided corresponding chuckings, or fixings 17, 18, 19, and 20.

In the embodiment of FIGS. 3 and 4, the chucking 17 can be provided with a porous portion 17a to allow for the filtering of dirt particles from the water.

Between each pair of neighboring ring parts, i.e. between ring parts 13 and 14, ring parts 14 and 15, and ring parts 15 and 16, can be positioned one of annular chambers 23a, 23i, and 23m. Each of ring lines 25a, 25i, and 25m for liquid lubricating oil, is connected to one of the annular chambers 23a, 23i, and 23m.

Each of the annular chambers 23a, 23i, and 23m is preferably also equipped with a lateral annular groove in which inflatable bodies 24a, 24i, and 24m, are inserted. Each of the inflatable bodies 24a, 24i, and 24m can be hydraulically operated, and each is preferably connected to one of a separate, closed ring line 26a, 26i, and 26m, in which heated, compressed air is circulated and into which the various operating means are integrated.

In FIG. 3, inflatable bodies 24a, 24i and 24m are shown in their deflated position, i.e. in the position wherein they are retracted into the lateral annular groove of the annular chambers 23a, 23i and 23m. The feed of heated, compressed air to bodies 24a, 24i and 24m is interrupted, or stopped, when they are in such a retracted position. This operating position, wherein bodies 24a, 24i and 24m are retracted, represents the normal condition wherein the lubricating oil is sufficiently heated and/or the propeller shaft 3 is rotating.

FIG. 4 shows inflatable bodies 24a, 24i and 24m in their inflated position, wherein the feed of heated compressed air is supplied to bodies 24a, 24i and 24m. As shown in FIG. 2, bodies 24a, 24i and 24m are expanded to occupy a significant portion of annular chambers 23a, 23i and 23m and, simultaneously, close the lubricant entrance openings for the lubricating oil to chambers 23a, 23i and 23m.

This operating position corresponds to the state in which propeller shaft 3 is stationary, possibly in icy, outside water. In this inflated position, inflated bodies 24a, 24i and 24m, with their increased surface area, may act as heat exchangers for the correspondingly reduced portion of the lubricant oil, and heat the lubricant so that damage to the ring seals 10a–10d is prevented when propeller shaft 3 is restarted.

The operating system (not shown) for inflating the bodies 24a, 24i, and 24m can essentially be conventional operating means consisting of: conventional display mechanisms for monitoring operation; a conventional pressure reservoir; a conventional cutoff and throttle mechanism; a conventional pump; and a conventional heat exchanger.

In addition to the embodiments described hereabove for seal arrangements for rotating propeller shafts, the invention can essentially be modified to fit any type of rotating shaft which is provided with seals for sealing out impurities or retaining a lubricating oil.

In summary, one feature of the invention resides broadly in a seal arrangement for rotating shafts, in particular propeller shafts of ships, which shafts are in contact with water containing impurities, in particular sea water, and which shafts are equipped with at least one ring seal, consisting of a lip seal and/or axial face seal, and a stationary backup system for the ring seal. The backup system comprises at least one backup ring, whereby in the backup system there is an annulus open toward the medium. At the open end of the annulus there is a ring-shaped dirt deflector which is designed in the manner of a lip seal, and this dirt deflector is in contact, on one side with the shaft, and on the other side with the end surface of the outermost back-up ring. The dirt deflector is rigidly connected to one of these components, so that an underpressure occurs in the annulus when the shaft rotates. The seal arrangement is characterized by the fact that the wall of the outermost backup ring 7 bordering the annulus 9, has a porous area 7a, 11 through it, which porous area is preferably made of sintered material, whereby the porosity of this area is selected so that a continuous streaming of medium is provided through the porous area 7a, 11 and the annulus 9 in the direction of the dirt deflector 8.

Another feature of the invention resides broadly in a seal arrangement characterized by the fact that the porous area 7a is formed by a change of the structure of the wall of the backup ring 7 adjacent to the annulus 9, in the sense of a permeability for fluids.

Yet another feature of the invention resides broadly in a seal arrangement characterized by the fact that the porous area is formed by a separate backup ring 11 made of porous material interposed between the outermost backup ring 76 and the adjacent backup ring 6.

Another additional feature of the invention resides broadly in a seal arrangement characterized by the fact that the dirt deflector is equipped with dynamically acting pump elements 12, such as fins or spiral grooves which, when the shaft 2 is in rotation, generate a pumping action and thus a flow of the medium W away from the opening of the annulus 9 outward.

Still another additional feature of the invention resides broadly in a seal arrangement characterized by the fact that the pumping elements 12 are designed so that when there is a reversal in the direction of rotation of the shaft, there is a reversal of the direction of flow through the porous area 7a, 11.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. A seal arrangement for a rotating propeller shaft of a ship, the propeller shaft having a first end disposed within the ship and a second end at least partly disposed in water having impurities therein, the propeller shaft having a first direction of rotation and a second direction of rotation opposite to said first direction of rotation, said seal arrangement comprising:

- at least one sealing means for being disposed about the propeller shaft between the first end of the shaft and the second end of the shaft;
- means for retaining said at least one sealing means about the propeller shaft;
- means for providing filtered water to an area in contact with said at least one sealing means, at least a portion of said means for providing filtered water being disposed to provide substantially filtered water to the area in contact with said at least one sealing means, said means for providing filtered water comprising means for filtering the impurities from the water;
- means for enhancing movement of water through said means for providing filtered water;
- said means for enhancing movement of water being configured for moving water having impurities therein through said means for providing filtered water to filter the impurities from the water and provide filtered water to the area in contact with said at least one sealing means upon rotation of the propeller shaft in said first direction; and
- said means for enhancing movement of water being configured for moving water from the area in contact with said at least one sealing means through said means for providing filtered water to clean filtered contaminants from the means for providing filtered water upon rotation of the propeller shaft in said second direction.

2. The seal arrangement according to claim 1, wherein:

- said means for retaining comprises a portion for surrounding at least a part of the second end of the propeller shaft adjacent said at least one sealing means; and
- said portion for surrounding comprises said means for providing filtered water.

3. The seal arrangement according to claim 2, wherein:

- said means for filtering comprises a porous material for passage of water therethrough to the area in contact with said at least one sealing means; and
- said porous material being for filtering the impurities from the water upon the passage of the water therethrough.

4. The seal arrangement according to claim 3, further comprising:

- at least one annulus disposed between said portion for surrounding and the propeller shaft, said annulus having a first end disposed adjacent said at least one sealing means and a second end disposed towards said second end of the propeller shaft, said first end of said annulus comprising said area in contact with said at least one sealing means; and
- an impurity deflector disposed about the propeller shaft and adjacent said second end of said annulus, said impurity deflector comprising a first portion for being disposed about and attached to the propeller shaft and a second portion extending from said first portion to substantially cover said second end of said annulus.

5. The seal arrangement according to claim 4, wherein said second portion of said impurity deflector has a first side for being disposed adjacent said second end of said annulus, and said first side comprises said means for enhancing movement of water through said porous material.

6. The seal arrangement according to claim 5, wherein:

- the first direction of rotation is for moving the ship forward and the second direction of rotation is for moving the ship in reverse;
- said means for enhancing movement of water pulls water through the porous material into the annulus upon rotation of the propeller shaft in said first direction; and
- said means for enhancing movement of water forces water out of the annulus through the porus material upon rotation of the propeller shaft in said second direction to thereby clean the filtered contaminants from the porous material.

7. The seal arrangement according to claim 6, wherein said means for enhancing movement of water comprises at least one of: fins and spiral grooves.

8. The seal arrangement according to claim 7, wherein:

- said at least one sealing means comprises at least a first and a second set of seals, each of said first and said second set of seals comprising at least one seal;
- said first set of seals for being disposed in a direction towards the water to seal out the water; and
- said second set of seals for being disposed in a direction towards the ship to seal in lubricating oil.

9. The seal arrangement according to claim 1, wherein:

- said means for filtering comprises a porous material;
- said porous material for being disposed between said means for retaining and said at least one sealing means, said porous material being for passage of water therethrough to the area in contact with said at least one sealing means; and
- said porous material being for filtering the impurities from the water upon the passage of the water therethrough.

10. The seal arrangement according to claim 3, wherein:

- said porous material comprises sintered material; and
- the impurities comprise particulate matter.

11. A seal arrangement for a rotating shaft, such as the shaft of a propeller for a ship, the shaft having a first end and a second end, the first end for being disposed in a first medium and the second end for being disposed in a second medium having particulate matter therein, the shaft having a first direction of rotation and a second direction of rotation, said second direction of rotation being opposite to said first direction of rotation, said seal arrangement comprising:

- at least one sealing means for being disposed about the shaft between the first end of the shaft and the second end of the shaft to separate the first medium from the second medium;
- means for retaining said at least one sealing means about the shaft;
- said means for retaining comprising at least a first portion for being disposed about at least a portion of the second end of the shaft adjacent said at least one sealing means;
- means for filtering the particulate matter from the second medium, said means for filtering being disposed to provide substantially filtered second medium to an area in contact with said at least one sealing means;

means for enhancing movement of said second medium through said means for filtering;

said means for enhancing movement of said second medium being configured for moving said second medium through said means for filtering into said area in contact with said at least one sealing means; and said means for enhancing movement of said second medium being configured for moving said second medium out of said area in contact with said at least one sealing means through said means for filtering to clean the filtered particulate matter from the means for filtering upon rotation of the shaft in said second direction.

12. The seal arrangement according to claim 11, wherein:
said means for retaining comprises a portion for surrounding the shaft; and
said portion for surrounding comprises said means for filtering.

13. The seal arrangement according to claim 12, wherein:
said means for filtering comprises a porous material for passage of said second medium therethrough to the area in contact with said at least one sealing means; and
said porous material being for filtering the particulate matter from said second medium upon the passage of said second medium therethrough.

14. The seal arrangement according to claim 13, further comprising:
at least one annulus disposed between said portion for surrounding and the shaft, said annulus having a first end disposed adjacent said at least one sealing means and a second end disposed towards said second end of the shaft, said first end of said annulus comprising said area in contact with said at least one sealing means; and
a particulate matter deflector disposed about the shaft and adjacent said second end of said annulus, said deflector comprising at least a first portion for being disposed about and attached to the shaft and a second portion extending from said first portion to substantially cover said second end of said annulus.

15. The seal arrangement according to claim 14, wherein said second portion of said deflector has a first side for being disposed adjacent said second end of said annulus, and said first side comprises said means for enhancing movement of said second medium through said porous material.

16. The seal arrangement according to claim 15, wherein:
said means for enhancing movement of said second medium pulls said second medium through the porous material into the annulus upon rotation of the shaft in said first direction; and
said means for enhancing movement of said second medium forces said second medium out of the annulus through the porous material upon rotation of the shaft in said second direction to thereby clean the filtered particulate matter from the porous material.

17. The seal arrangement according to claim 16, wherein said means for enhancing movement of said second medium comprises at least one of: fins and spiral grooves.

18. The seal arrangement according to claim 17, wherein:
said at least one sealing means comprises at least a first and a second set of seals, each of said first and said second set of seals comprising at least one seal;
said first set of seals for being disposed in a direction towards said second medium to seal out the second medium;
said second set of seals for being disposed in a direction towards said first medium to seal in said first medium; and
said first and said second medium comprise at least one of the following sets of mediums;
gas and liquid; and
first liquid and second liquid.

19. The seal arrangement according to claim 11, wherein:
said means for filtering comprises a porous material;
said porous material for being disposed between said means for retaining and said at least one sealing means, said porous material being for passage of said second medium therethrough to the area in contact with said at least one sealing means; and
said porous material being for filtering the impurities from the water upon the passage of the water therethrough.

20. The seal arrangement according to claim 18, wherein:
said porous material comprises sintered material;
said first liquid comprises sea-water having impurities therein; and
said second liquid comprises lubricating oil.

* * * * *